United States Patent
Montgomery et al.

(10) Patent No.: US 7,911,591 B2
(45) Date of Patent: Mar. 22, 2011

(54) OPTICAL TRANSIT TIME VELOCIMETER

(75) Inventors: Derek Montgomery, New Westminster (CA); Daryl G. James, Burnaby (CA); David Yue Yan, Burnaby (CA); Ivan Melnyk, Coquitlam (CA); Ondrej Mecl, New Westminster (CA)

(73) Assignee: Photon Control Inc., Burnaby, British Columbia (CA)

( * ) Notice: Subject to any disclaimer, the term of this patent is extended or adjusted under 35 U.S.C. 154(b) by 927 days.

(21) Appl. No.: 11/721,862

(22) PCT Filed: Dec. 14, 2005

(86) PCT No.: PCT/CA2005/001918
§ 371 (c)(1),
(2), (4) Date: Jul. 6, 2007

(87) PCT Pub. No.: WO2006/063463
PCT Pub. Date: Jun. 22, 2006

(65) Prior Publication Data
US 2009/0323048 A1    Dec. 31, 2009

(30) Foreign Application Priority Data
Dec. 17, 2004  (CA) .................................. 2490532

(51) Int. Cl.
*G01B 3/36* (2006.01)
(52) U.S. Cl. .................................. 356/28; 356/28.5

(58) Field of Classification Search ........ 356/3.01–3.15, 356/4.01–4.1, 5.01–5.15, 6–22
See application file for complete search history.

(56) References Cited

U.S. PATENT DOCUMENTS

| | | | |
|---|---|---|---|
| 4,099,870 A * | 7/1978 | Luzzi | .............................. 356/28 |
| 4,251,733 A | 2/1981 | Hirleman, Jr. | |
| 5,121,988 A | 6/1992 | Blesener et al. | |
| 6,580,506 B2 | 6/2003 | Inman, Jr. | |
| 2004/0207832 A1 * | 10/2004 | Ohtomo et al. | .............. 356/4.01 |

* cited by examiner

*Primary Examiner* — Thomas H Tarcza
*Assistant Examiner* — Luke D Ratcliffe
(74) *Attorney, Agent, or Firm* — McKee, Voorhees & Sease, P.L.C.

(57) ABSTRACT

An L2F velocimeter comprises a probe for insertion into a fluid, the probe having an open area therein to allow the fluid to pass through. The probe comprises an illumination system to direct a pair of light beams, separated by a distance, through the open area, and a collection system to collect forward scattered light scattered from particles in the fluid. The collection system has an optical axis in common with the illumination system. The velocimeter further comprises an electro optical assembly connected to the probe to provide light to the illumination system, to receive light collected from the collection system, to measure a lapse time in fluctuations of the forward scattered light created by particles passing through the pair of light beams and to calculate the velocity of the fluid based on the lapse time and the separation distance.

28 Claims, 5 Drawing Sheets

OPTICAL TRANSIT TIME VELOCIMETER

TECHNICAL FIELD

The present invention relates generally to velocimeters for measuring the speed of flowing fluids. More specifically, the invention relates to optical velocimeters which determine the velocity of a fluid carrying particles by measuring the transit times of the particles through a test area between two focused light beams.

BACKGROUND

One optical method for measuring fluid velocity is known in the art as "laser-two-focus" (L2F) velocimetry. L2F velocimetry is based on detection of light pulses caused by particles crossing two focused laser beams, and determining the average lapse time it takes for particles to move with the fluid from one focused beam to the other. The flow velocity is calculated by dividing the spacing between two laser beams by the lapse time. The flow velocity can be measured using L2F velocimetry to an accuracy of within 0.01% based on accurate beam focusing and fast digital signal processing. For this reason, L2F velocimetry is particularly suitable for study of complex flow of gases and transparent liquids. Other applications include measurement of gases in the pipes at very low (slower than 0.1 m/s) to very high (faster than 100 m/s) speeds. Such high range is necessary for measurement of fluctuated gases such as flare gases in large pipes.

There exist L2F velocimeters for measuring complex fluid flow in small pipes and channels such as ones used in turbomachinery (e.g., U.S. Pat. No. 3,941,477 to Schodl and No. 4,707,130 to Hofmann et al.). Such systems include a housing with an optical illumination system configured to direct two laser sheets through the flow, and an optical collection system to collect light which is back-scattered light by particles in the flow and to focus it into two photodetectors. The optical axis of the collection system is parallel to the sheets of light. The illumination system sends the light through a central area of the collection system, which collects the light back-scattered from the particles received in a peripheral area.

Referring to Hoffmann et al., which discloses an example optical arrangement of this first type of prior art, the optical arrangement includes a laser and a splitter which create two parallel beams, and a lens and two mirrors configured to direct the beams through an optical cell having a convex lens and a concave lens which focus the beams on two test points. Light from the two beams is back scattered from the test points through the optical cell and another lens and directed onto photomultipliers through a shutter.

One shortcoming of such systems is that the intensity of back-scattered light is much lower than of forward-scattered light. This reduces the signal-to-noise ratio to such a degree that such systems generally require particle seeding (adding particles to the flow) to operate. Particle seeding, however, is not allowed in many petrochemical applications such as natural gas pipelines, flare stacks and venting pipes.

Such systems also do not allow for the cost effective design of compact velocimeters to be used in large pipes, because if the testing area is placed far from the housing, there must be a proportional increase in the size of the aperture of the optical collection system. Large optical systems increase the cost of the velocimeter.

Another type of prior art optical gas flow meter which is based on a L2F velocimeter comprises a housing rigidly mounted to a plate providing direct access to the fluid flow in a pipe (e.g., U.S. Pat. No. 6,128,072 to Kiel et al.). The optical collection system detects the forward-scattered light but it is displaced at a certain angle from the optical axis of the illumination system in order to avoid capturing the unscattered light.

Referring to Kiel et al., which discloses an example optical arrangement of this second type of prior art, the optical arrangement is based on a plate with a central hole that preferably matches the inside diameter of the pipe through which the fluid flows. An optical fiber mounted on the plate terminates at a collimator to direct light from the fiber to a prism which splits the light into two beams. The beams are reflected by a mirror and focused by a cylindrical lens to create two parallel beams through a measurement volume. Light from the beams is scattered by particles passing through the measurement volume and a portion of the scattered light is collected by a refractive doublet and focused to an image point. The light is preferably collected at an angle in the range of 5 to 25 degrees from the direction of the parallel beams.

One drawback of this second type of prior art velocimeter is that it is not suitable for pipes of various diameters, since the plate and optical system must be designed individually for each pipe size. Also, the off-axis location of the optical collection system reduces collection efficiency of the collection system because it only accepts the scattered light in a limited solid angle. Furthermore, it is not practical to insert this second type of prior art velocimeter into very large pipelines.

Another disadvantage of the second type of prior art systems is that optical meters installed in pipelines can be affected by window fouling. Accordingly, it is necessary to have a housing which will allow removing the optics for cleaning purpose without depressurizing the pipe. Removing the plate according to the above art requires a complex mechanical setup which with combination of complex high-pressure fiber optic feed-through makes the meter expensive.

Prior art L2F velocimeters can be accurate. However, they tend to determine the fluid velocity in a limited testing area where laser beams are focused. This makes them vulnerable to differences in velocity across the flow profile. Kiel et al. discloses a multi-point L2F velocimeter wherein one testing area is located in the center of the pipe and a number of testing areas are located a quarter-radius distance from the wall. The quarter-radius location is less susceptible to flow profile, according to fluid dynamic calculations. Multi-point L2F velocimeters, however, require complex optical systems to create multiple testing zones across the flow profile.

Therefore, there is a need for optical velocimeters which do not require particle seeding and which are suitable for fluid velocity measurement in pipes of various diameters. There is also a need for velocimeters having housings that are easily removable from fluid carrying pipes for cleaning purposes and maintenance.

SUMMARY OF INVENTION

One embodiment of the invention provides a L2F velocimeter comprising a probe which may be inserted into a flowing fluid. The probe has an optical illumination system and an optical collection system which are coaxial. The illumination system directs light through the fluid, and the collection system collects forward scattered light which passes through the fluid.

Further aspects of the invention and features of specific embodiments are described below.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

One embodiment of the invention provides a L2F velocimeter comprising a probe which may be inserted into a flowing fluid. The probe has an optical illumination system and an optical collection system which are coaxial. The illumination system directs a pair of light sheets through an open area of the probe through which the fluid flows. The light sheets are perpendicular to the flow direction, and separated by a predetermined distance along a direction parallel to the flow direction. Particles in the flow which pass through the two sheets scatter the light, causing fluctuations in the scattered light. The collection system collects forward scattered light which passes through the fluid. An electro-optical assembly receives the collected light and determines a lapse time between the fluctuations caused by the particles by monitoring the fluctuations. The collection system may comprise a mirror, such that the length of the probe may be reduced, thereby reducing disturbance of the flow and allowing measurement of the flow velocity in pipes having a smaller diameter.

Figure 1:
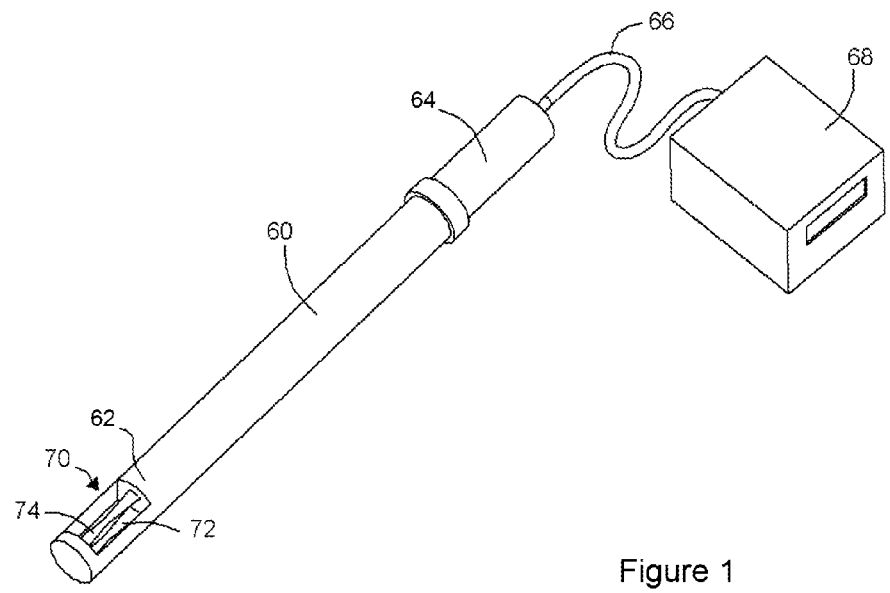
FIG. 1 schematically illustrates a L2F velocimeter according to one embodiment of the invention.

FIG. 1 shows a L2F velocimeter according to one embodiment of the present invention. The velocimeter includes a probe 60 with a distal end 62 that is inserted into a fluid and a proximal end 64 to provide mechanical support of the probe and to mount a cable 66. The cable 66 connects the probe 60 with an electro-optical assembly 68. The distal end of the probe 60 has an open area 70 through which fluid can pass. An optical illumination system (not shown in FIG. 1) receives light from the electro-optical assembly 68 and creates two light sheets 72 and 74 in the middle of the open area 70 through which particles are carried by the fluid. Light scattered by the particles is collected by an optical collection system which is coaxial with the optical illumination system and returned to the electro-optical assembly 68.

Figure 2:
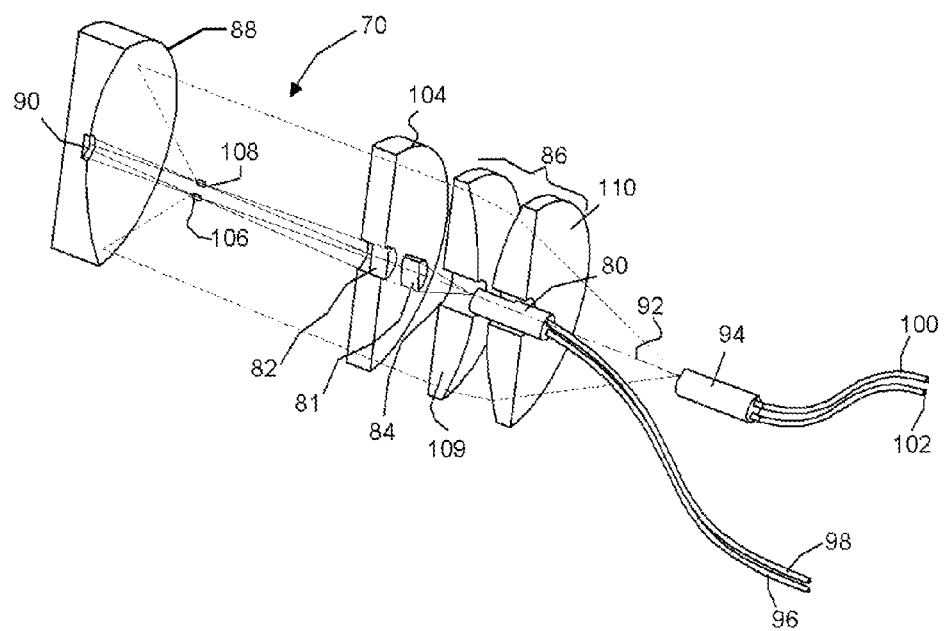
FIG. 2 is a detailed view of the optical system of FIG. 1.

FIG. 2 illustrates the optical illumination and collection systems of the velocimeter of FIG. 1. The optical illumination system includes an illumination ferrule 80, a coupling lens 81 and a cylindrical lens 82. The illumination system is located in a central aperture 84 of a focusing assembly 86. The focusing assembly 86 comprises first and second lenses 109 and 110. The optical collection system comprises a mirror 88 with an obscuration 90 in the center, and the focusing assembly 86. The mirror 88 is located coaxially with an optical axis 92 of the coupling lens 81, the cylindrical lens 82 and lenses 109 and 110 of the focusing assembly 86. A collection ferrule 94 is positioned along the optical axis 92 and behind the illumination ferrule 80 in the image plane created by the focusing assembly 86. Two illumination fibers 96 and 98 are coupled to the illumination ferrule 80 and two collection fibers 100 and 102 are coupled to the collection ferrule 94. The fibers 96, 98, 100 and 102 are combined in the optical cable 66 shown in FIG. 1. A window 104 is preferably located between the coupling lens 81 and the open area 70 to protect the lens system and fiber optics from the environment. The cylindrical lens 82 may be located in an aperture in the middle of the window 104. The mirror may be protected by another window (not shown).

The cylindrical lens 82 spreads the light from fibers 96 and 98 into bright light sheets 106 and 108 in the open area 70, which correspond to light sheets 72 and 74 of FIG. 1. The size of the obscuration 90 is selected to absorb all direct light coming from the fibers 96 and 98. Light, scattered from particles crossing the light sheets with the fluid flow, is collected by the mirror 88. The mirror 88 reflects and collimates the light to the focusing assembly 86. A peripheral zone of the first lens 109 receives light reflected from the mirror 88 and focuses it onto a peripheral zone of the second lens 110, which in turn focuses the collimated light into receiving apertures of the collection fibers 100, 102.

Figure 3:
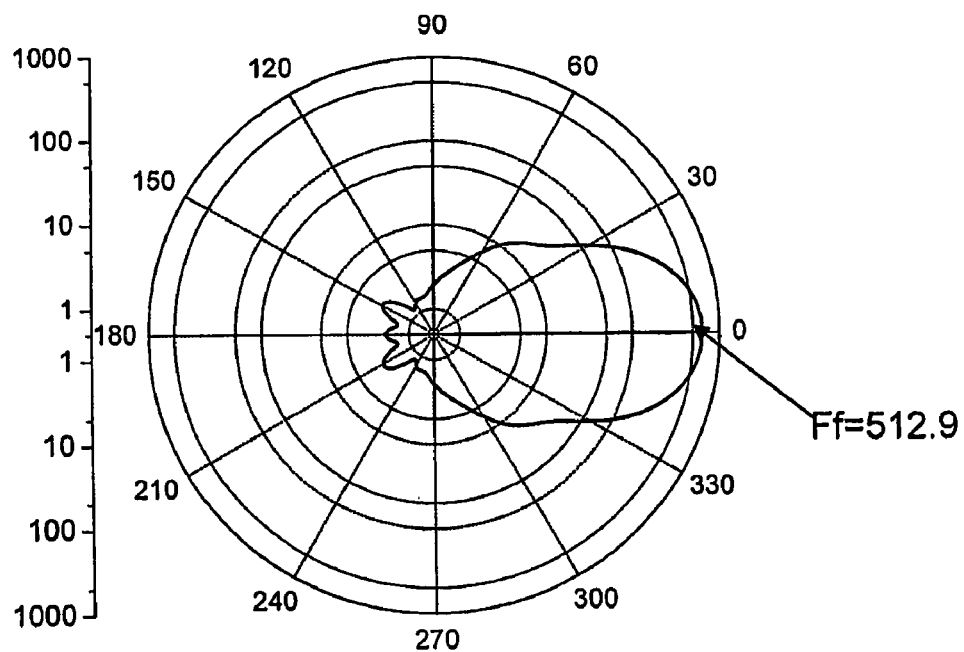
FIG. 3 is a graphic representation of the calculated intensity of monochromatic light (650 μm) scattered on small particles (0.5 to 1.5 μm)

FIG. 3 shows the theoretical light distribution calculated based on Mie approximation for particles ranging from 0.5 to 1.5 μm in diameter. Such particles are typical in natural gas pipelines and in the majority of flare stacks. The calculation was done for a monochromatic light, wavelength of 0.650 μm, which is typical for miniature lasers suitable for L2F velocimetry. The relative intensities of the light scattered near 0 degrees (forward scattered light) and near 180 degrees (back scattered light) are $F_f=512.9$ and $F_b=3.0$, respectively. Therefore, optical collection systems which collect forward scattered light, such as those according to the invention, can be up to 170 times more efficient than optical collection systems which collect back scattered light.

Figure 4:
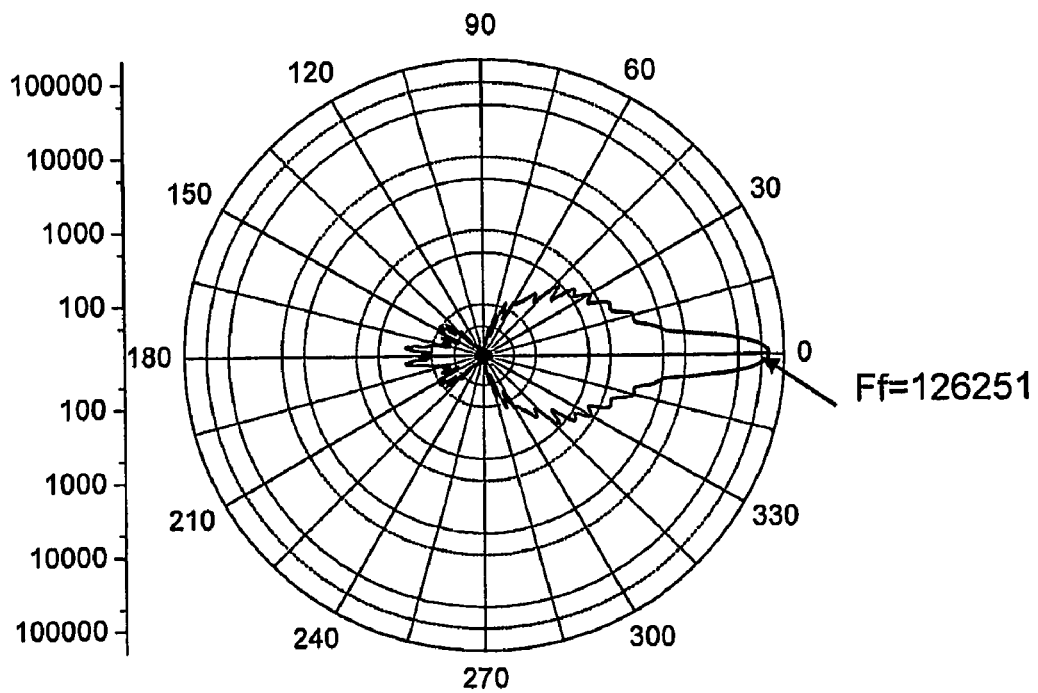
FIG. 4 is a graphic representation of the calculated intensity of monochromatic light (650 μm) scattered on large particles (2 to 10 μm)

The difference in efficiency between collection of forward and back scattered light increases with the size of particles due to more directional light scattering. FIG. 4 shows an angular distribution of the type shown in FIG. 3 for light scattered by particles from 2 to 10 μm in diameter. The ratio between forward-scattered and back-scattered intensities is $F_f/F_b=126251.0/152.5=827$ for these larger particles.

This explains a major drawback of the first type of prior art discussed above which provides detectivity reduced by the same proportion. Optical collection systems which collect back scattered light can effectively detect particles only if they are added to the flow (the back-scattered light flux $F_b$ increases with particle diameter). However, particle seeding is generally not allowed in industrial flow measurements.

Likewise, the efficiency of the second type prior art is affected by the non-coaxial design of the optical systems. The acceptance angle of optical collection systems according to the second type of prior art is lower than that of the FIG. 2 embodiment due to the angular disposition of the collection system from the direction of the beams.

Figure 5:
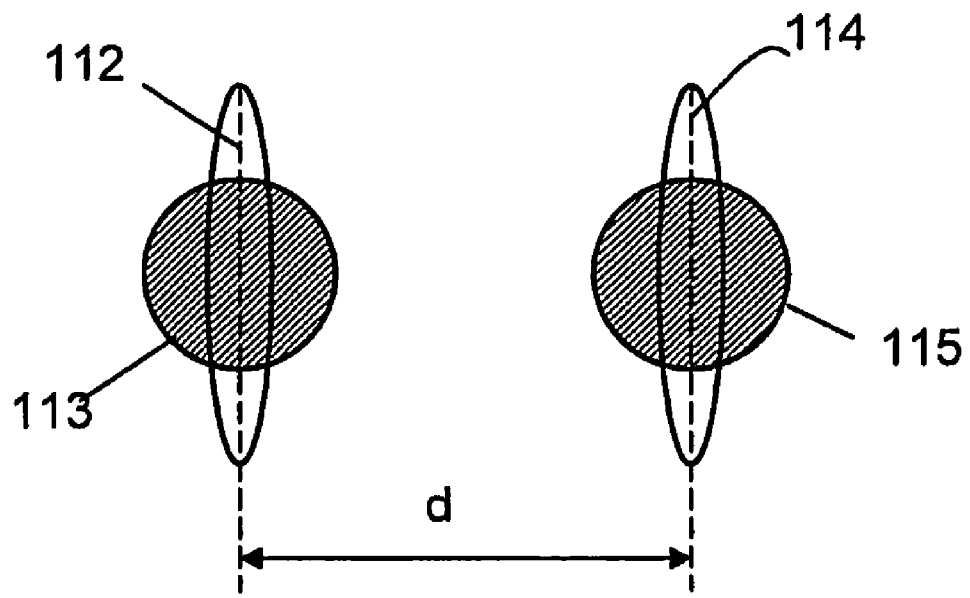
FIG. 5 schematically illustrates the location of the light spots created by the optical system of FIG. 2 in a measuring area.

FIG. 5 illustrates the shape of the light beams from the illumination fibers 96 and 98 in the plane of light sheets 106 and 108 of FIG. 2. The elliptical spots 112 and 114 represent cross-sections of the light sheets 106 and 108 in a plane perpendicular to optical axis The round spots 113 and 115 represent projections of the cores of the illumination fibers 96 and 98 in the same plane. The spots 112 and 114 are displaced at a distance d which depends the spacing of fibers 96 and 98 in the illumination ferrule 80 and magnification of the lenses 81 and 82. The distance d is one of two parameters which are used for velocity calculation: $V=d/\tau$, where $\tau$ is the average time it takes for the particles to travel between spots 112 and 114.

Figure 6:
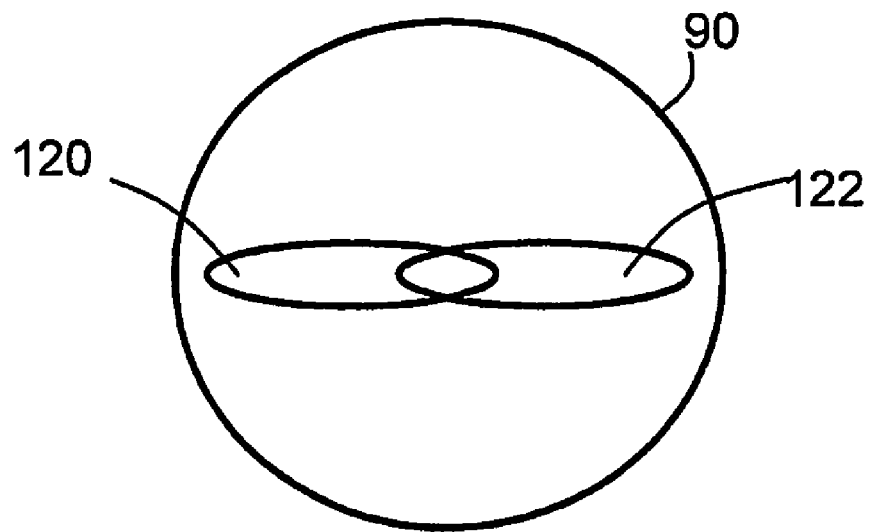
FIG. 6 illustrates the location of the light spots created by the optical system of FIG. 2 in a plane of obscuration.

FIG. 6 illustrates the shape of the light beams from the illumination fibers 96 and 98 in the plane of the obscuration 90 on mirror 88 of FIG. 2. The spots 120 and 122 are typically expanded in a direction perpendicular to the orientation of spots 112 and 114 of FIG. 5 due to the effect of the cylindrical lens 82.

Preferably, the illumination fibers 96 and 98 are single-mode optical fibers having core diameters ranging from 4 to 9 µm depending on the wavelength of light used. Such fibers allow the production of light sheets less than 15 µm wide, thus achieving high light concentration in the measuring area. The fiber core can be selected taking into account that scattering efficiency increases with shorter wavelength and the total amount of the light coupled into the fiber is lower in thinner fibers. Preferably, the collection fibers 100 and 102 are multi-mode optical fibers having core diameters ranging from 50 to 500 µm and high numerical apertures. Although generally thicker collection fibers are preferable, the optimum diameter of the collection fibers 100 and 102 depends on the magnification of the collection optical system (the mirror 88 and the focusing assembly 86) and the distance d.

The preferable value for the distance d depends on a number of factors, from which the desired accuracy, the range of velocities to be measured and the turbulence level are dominant. Larger values of d result in higher accuracy in the measurement of the time between two pulses caused by a particle crossing the spots 112 and 114. However, the probability that a single particle will cross both the spots 112 and 114 decreases as d increases, due to the effects of turbulence. A sheet spacing d of approximately 1.0 mm is well suited for most industrial flow applications with velocities ranging from 0.1 to 100 m/s and turbulence level of less than 5%.

The optical system shown in FIG. 2 has a high efficiency as it collects forward-scattered light. The portion of the scattered light which is absorbed by the obscuration 90 depends on the size of the obscuration 90 and the distance between location of the sheets 106 and 108 and the mirror 88. In an example embodiment, these dimensions define a typical obscuration angle of 3 degrees and a collecting angle of 12 degrees for a probe diameter of ¾" (19.1 mm). Prior art systems of the type disclosed in Hofmann et al. having roughly the same geometry will collect scattered light from about 168 to 177 degrees. The relative collection efficiency (Eff) of this example embodiment versus prior art systems of the type of Hofmann et al. may be calculated by integrating the light distribution shown in FIGS. 3 and 4 within solid angles from 3 to 12 degrees and from 168 to 177 degrees to get the intensities of the collected light ($F_{3-12}$ and $F_{168-177}$, respectively) and taking the ratio of the light intensities: $Eff=F_{3-12}/F_{168-177}$. The collection efficiency increase as compared to the prior art can be found as $5.4 \times 10^6$ and $1.3 \times 10^6$ for small and large particles, respectively, for this example embodiment.

Figure 7:
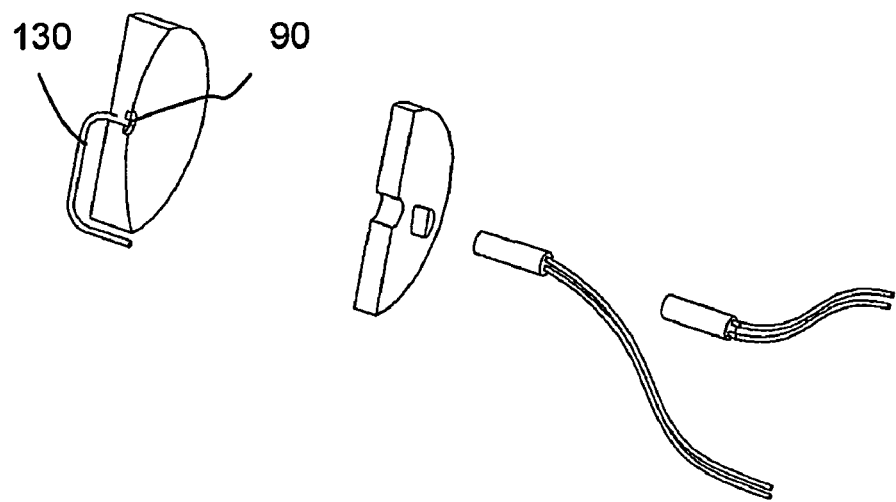
FIG. 7 shows a L2F velocimeter having a reference fiber in the concave mirror according to another embodiment of the invention.

According to another embodiment of the invention, a reference optical fiber 130 is placed in the obscuration 90 as shown in FIG. 7. The reference optical fiber 130 collects the portion of light which reaches the obscuration 90. This allows for control of the overall light intensity, which may vary over time due to the window fouling, degradation and thermal instability of the light sources, etc.

Figure 8:
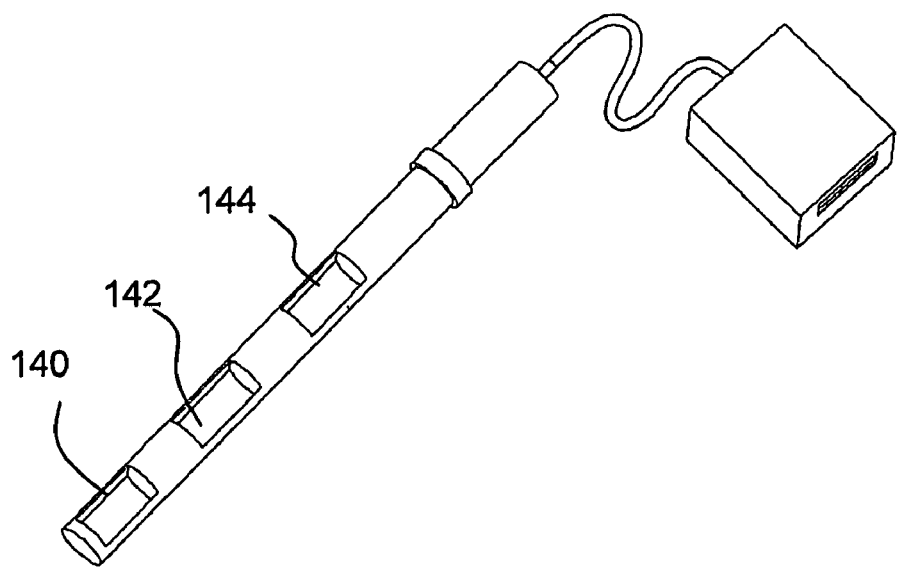
FIG. 8 illustrates a L2F velocimeter for multi-point velocity measurement according to another embodiment of the invention; and, FIG. 9 shows a L2F velocimeter with an insertion device for insertion of the probe in various locations across the flow according to another embodiment of the invention.

According to another embodiment of the invention, the proximal end of the probe may have a number of open areas for measurement of fluid velocity at different points in the flow. FIG. 8 shows three open areas 140, 142 and 144. Each of open areas 140, 142 and 144 is associated with coaxial optical illumination and collection systems as shown in FIG. 2 or in FIG. 7. This arrangement provides velocity measurement in multiple points which is desirable in many applications such as gas flow measurement in large stacks and pipes.

Figure 9:
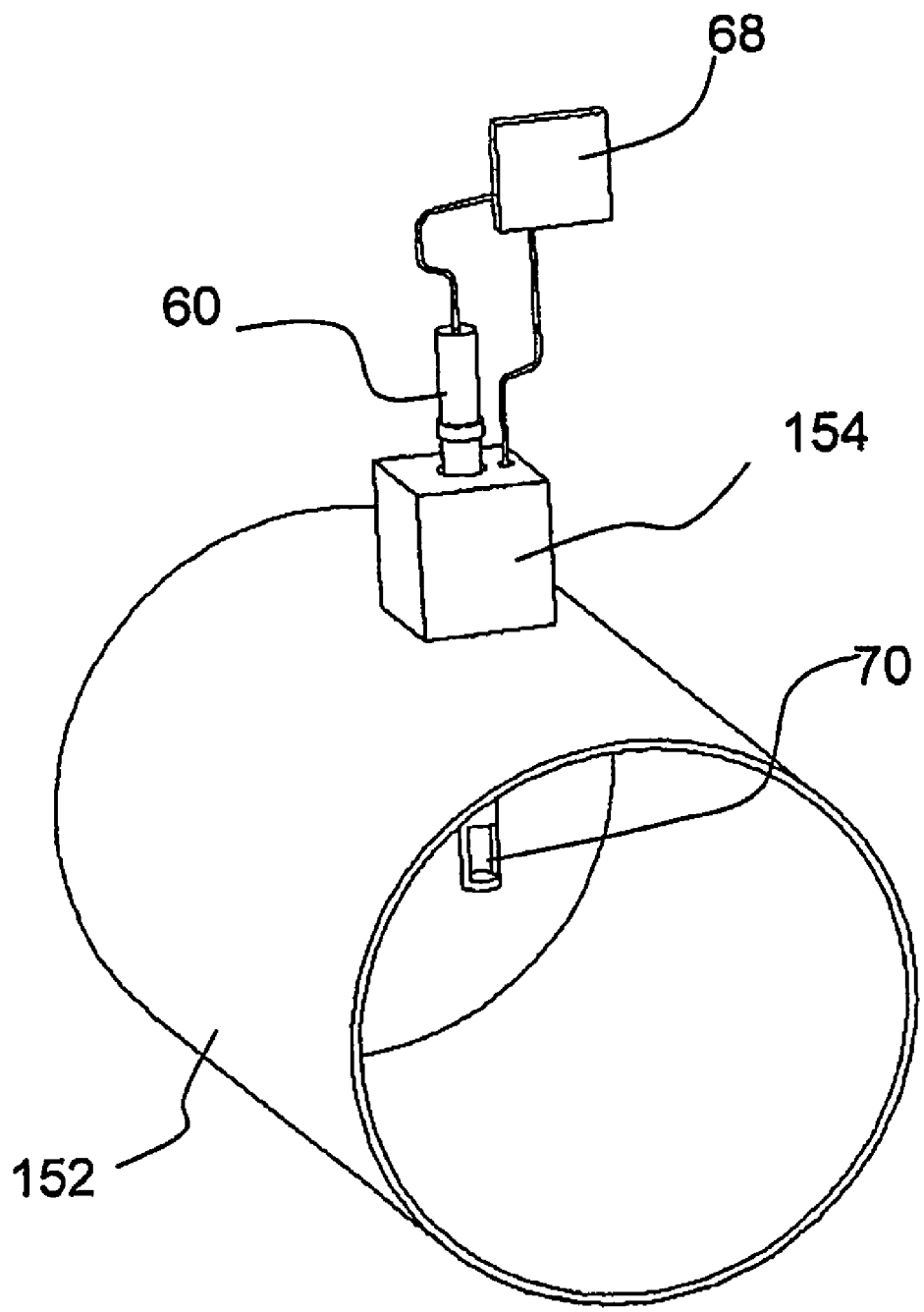

Velocity profile measurement can be achieved by moving the measuring zone across the fluid flow as illustrated in FIG. 9. The insertion probe 60 is inserted into a large pipe 152 by an insertion device 154. The insertion device 154 places the probe 60 at a certain depth in the pipe 152, thus the open area 70 with the measuring zone can measure the velocity at different locations. The insertion device is connected to the electro-optical assembly 68 for the final calculation of velocity as a function of the probe location.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for measuring the velocity of a flowing fluid, the apparatus comprising:
    a probe for insertion into the fluid, the probe having an open area therein configured to allow the fluid to pass therethrough, the probe comprising:
    an illumination system configured to direct a pair of light beams separated by a separation distance through the open area; and,
    a collection system configured to collect forward scattered light from particles in the fluid which pass through the pair of light beams, and having an optical axis in common with the illumination system, the collection system comprising a reflector element configured to reflect the forward scattered light back in a direction toward the illumination system; and,
    an electro-optical assembly connected to the probe and configured to provide light to the illumination system and receive light collected by the collection system for measuring a lapse time in fluctuations in the forward scattered light created by particles passing through the pair of light beams and for calculating a velocity of the fluid based on the lapse time and the separation distance.

2. An apparatus according to claim 1 wherein the reflector element comprises a concave mirror having an optical axis in common with the illumination system and the collection system.

3. An apparatus according to claim 1 wherein the collection system comprises an obscuration located on the optical axis for absorbing unscattered light from the light beams.

4. An apparatus according to claim 3 wherein the collection system comprises a reference optical fiber positioned to receive light incident on the obscuration.

5. An apparatus according to claim 1 wherein the collection system comprises a focusing assembly configured to focus the reflected forward scattered light onto a pair of optical fibers coupled to the electro-optical assembly.

6. An apparatus according to claim 5 wherein the reflector element and the focusing assembly are on opposite sides of the open area.

7. An apparatus according to claim 5 wherein the focusing assembly has an aperture in a central portion thereof, and the illumination system projects light through the aperture.

8. An apparatus according to claim 7 wherein the illumination system comprises a pair of optical fibers coupled to the electro-optical assembly and held apart by a predetermined distance by an illumination ferrule positioned in the aperture of the focusing assembly.

9. An apparatus according to claim 8 wherein the collection system comprises a pair of optical fibers positioned in an image plane of the focusing assembly, wherein the image plane and the open area are located on opposite sides of the illumination ferrule.

10. An apparatus according to claim 9 wherein the pair of optical fibers are held in place by a collection ferrule.

11. An apparatus according to any one of claim 1 wherein the pair of light beams comprise a pair of light sheets.

12. An apparatus according to claim 1 wherein the illumination system comprises a cylindrical lens positioned along the optical axis.

13. An apparatus according to claim 5 wherein the probe comprises a window positioned between the focusing assembly and the open area.

14. An apparatus according to claim 2 wherein the probe comprises a window positioned between the mirror and the open area.

15. An apparatus according to claim 1 wherein the probe comprises a plurality of open areas, and wherein each open area has an illumination system and a collection system associated therewith.

16. A method of measuring the velocity of a flowing fluid, the method comprising:
    directing a pair of light beams separated by a separation distance through the fluid with an illumination system;
    collecting forward scattered light scattered by particles in the fluid with a collection system having an optical axis in common with the illumination system;
    reflecting the collected forward scattered light back in a direction toward the illumination system to a pair of photodetectors;
    determining a lapse time between fluctuations in the collected forward scattered light caused by particles passing through the pair of light beams; and,
    calculating the velocity of the fluid based on the separation distance and the lapse time.

17. A method according to claim 16 comprising: positioning the illumination and collection systems in a probe, the probe having an open area therein;
    inserting the probe into the fluid such that the fluid flows through the open area.

18. A method according to claim 16 wherein collecting the forward scattered light comprises absorbing unscattered light with an obscuration, the obscuration positioned on the optical axis.

19. A method according to claim 18 wherein reflecting the forward scattered light comprises collecting and measuring unscattered light on the optical axis for signal normalization purposes.

20. An apparatus according to claim 2 wherein the pair of light beams comprise a pair of light sheets.

21. An apparatus according to claim 3 wherein the pair of light beams comprise a pair of light sheets.

22. An apparatus according to claim 4 wherein the pair of light beams comprise a pair of light sheets.

23. An apparatus according to claim 5 wherein the pair of light beams comprise a pair of light sheets.

24. An apparatus according to claim 6 wherein the pair of light beams comprise a pair of light sheets.

25. An apparatus according to claim 7 wherein the pair of light beams comprise a pair of light sheets.

26. An apparatus according to claim 8 wherein the pair of light beams comprise a pair of light sheets.

27. An apparatus according to claim 9 wherein the pair of light beams comprise a pair of light sheets.

28. An apparatus according to claim 10 wherein the pair of light beams comprise a pair of light sheets.

* * * * *